US005610239A

United States Patent [19]
Skelley

[11] Patent Number: 5,610,239
[45] Date of Patent: Mar. 11, 1997

[54] TWO COMPONENT ADHESIVE

[75] Inventor: Richard Skelley, Hillsborough, N.C.

[73] Assignee: Reichhold Chemicals, Inc., Research Triangle Park, N.C.

[21] Appl. No.: 546,065

[22] Filed: Oct. 20, 1995

[51] Int. Cl.$^6$ .................. C09J 107/02; C09J 109/02; C09J 109/06; C09J 123/16

[52] U.S. Cl. .................. 525/331.7; 525/331.9; 525/383; 156/338; 428/425.3; 428/436; 428/460; 428/477.4; 428/501; 428/524; 428/526; 428/528

[58] Field of Search .................. 526/239; 428/425.3, 428/436, 460, 477.4, 501, 524, 526, 528; 156/338; 525/331.7, 331.9, 383

[56] References Cited

U.S. PATENT DOCUMENTS

| | | | |
|---|---|---|---|
| 2,453,752 | 11/1948 | La Plana et al. | 260/6 |
| 2,610,216 | 9/1952 | Hall | 260/820 |
| 3,640,675 | 2/1972 | Thomas | 8/115.6 |
| 3,870,675 | 3/1975 | Kusayama et al. | 260/32.8 |
| 3,988,306 | 10/1976 | Turner | 528/493 |
| 4,012,350 | 3/1977 | Burke, Jr. et al. | 260/29.3 |
| 4,131,584 | 12/1978 | Burke, Jr. et al. | 260/29.6 |
| 4,197,219 | 4/1980 | Damico | 260/7 |
| 4,208,485 | 6/1980 | Nahta | 521/65 |
| 4,228,045 | 10/1980 | Bezwada | 260/4 |
| 4,255,486 | 3/1981 | Burke, Jr. et al. | 428/356 |
| 4,386,992 | 6/1983 | Takegawa et al. | 156/327 |
| 4,431,757 | 2/1984 | Okitsu et al. | 524/25 |
| 4,479,840 | 10/1984 | Takegawa et al. | 156/327 |
| 4,699,824 | 10/1987 | Pufahl | 428/220 |
| 4,828,556 | 5/1989 | Braun et al. | 604/365 |
| 5,190,997 | 3/1993 | Lindemann et al. | 524/44 |

OTHER PUBLICATIONS

J. C. Carl; *Neoprene Latex: Principles of Compounding and Processing*, E. I. DuPont DeNemours & Co. (Inc.), pp. 9, 19, 31, and 36 (1962).

*Primary Examiner*—W. Robinson H. Clark
*Attorney, Agent, or Firm*—Bell, Seltzer, Park & Gibson

[57] ABSTRACT

A two component adhesive comprising a natural or synthetic rubber first component and a second component capable of destabilizing the natural or synthetic rubber first component slowly can be utilized in conventional application equipment designed for applying single component adhesives is provided.

6 Claims, No Drawings

TWO COMPONENT ADHESIVE

FIELD OF THE INVENTION

The present invention relates to a two component adhesive for bonding various substrates together, and more particularly to a two component adhesive which can be used in conventional application equipment (e.g., spray guns) designed for applying single component adhesives.

BACKGROUND OF THE INVENTION

Various two component adhesive systems are known. These two component adhesives often contain, as the active component, polyester acrylate, resorcinol, phenol, epoxy, isocyanate acrylic, and the like. Conventionally the two components are precisely measured and mixed together prior to their use as an adhesive. If the measuring of the precise amount or if the mixing process is not carefully conducted, various desired adhesion properties may be substantially reduced. Additionally, with respect to many of these two component adhesive compositions, immediately after mixing, the components begin to react, build viscosity and eventually solidify to make the adhesive unusable. Thus, extended pot life is often a problem.

Various rapid setting two component adhesives have been proposed. For example, component A is applied to one substrate; component B is applied to the other substrate; and the substrates are contacted together to cause the components to rapidly react to form a bond between the substrates. See, for example, U.S. Pat. No. 3,870,675 to Kusayama et al. which proposes a component A comprising 40 to 80 parts by weight of at least one divinyl compound and 0.5 to 15 parts by weight acrylonitrile-butadiene-styrene polymer (ABR), acrylonitrile-butadiene rubber (NBR) or carboxylate rubber and component B comprising 0.01 to about 10 parts by weight of a thiourea compound, about 0.01 to about 10 parts by weight of $\alpha,\alpha'$-dipyridyl, 0.001 to 5 parts by weight of at least one of copper salts, cobalt salts, manganese salts, chromium salts and vanadium salts of organic and inorganic acids, and 75 to 100 parts by weight of an organic volatile solvent. The two components of the adhesive are separately applied to a surface of different articles and then the articles are combined together.

U.S. Pat. No. 4,431,757 to Okitsu et al. proposes a two component adhesive comprising solutions of components A and B. Component A is an aqueous solution of a high polymer having an amide bond or an imide bond within the molecule, or an aqueous dispersion obtained by adding a rubber latex and/or synthetic resin emulsion to the aqueous solution of the high polymer. Component B is an aqueous solution of a dialdehyde compound, or an aqueous solution or dispersion obtained by adding a crosslinking agent for crosslinking the high polymer of component A to the aqueous solution of the dialdehyde compound.

Most two component adhesives have to be applied using separate application means such as spray guns or a single application means having dual nozzles wherein the components react in the spray as the components are applied to a substrate. It would, however, be more desirable and is an object of the present invention to provide a two component adhesive suitable for applying using an application means which is adapted for dispensing single component adhesives.

It is another object of the present invention to provide a two component adhesive which can produce excellent green strength in a controlled yet rapid manner.

It is yet another object to provide a two component adhesive having an extended and usable pot life.

SUMMARY OF THE INVENTION

These and other objects, features and advantages are provided by the two component adhesive of the present invention. We have found that a two component adhesive comprising a natural or synthetic rubber first component and a second component capable of destabilizing the natural or synthetic rubber first component slowly can be utilized in conventional application equipment designed for applying single component adhesives. What is meant by "destabilizing . . . slowly" is that an increase in viscosity and curing occurs in a controlled manner such that the two components of the adhesive can be applied through a spray gun designed for a single component. The adhesive matures and becomes tacky without curing so fast that it clogs the spray gun. The adhesive of the invention also has excellent initial green strength such that the substrates can be bonded together within a few seconds. This is contrasted to so-called "shocking" the Component A so that it gels and cures so quickly on combination with component B that it is a solid within 5–10 seconds. This conventional two component adhesive is unusable in a spray gun designed for applying single component adhesives in that the adhesive will cure in the spray gun thus ruining the equipment.

The present invention also relates to a process of bonding together two or more like or dissimilar substrates, e.g., foam, textile materials, wood, cellulosics, metals, polymers, glass and the like. The method is a one-step process comprising applying (e.g., spraying) a two component adhesive through a single component spray gun onto at least one of the substrates. The two component adhesive comprises the adhesive as described hereinabove.

DETAILED DESCRIPTION OF THE INVENTION

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

As stated above, the two component adhesive of the present invention is suitable for use in an application means adapted for dispensing single component adhesives. The two component adhesive comprises a natural or synthetic rubber first component and a second component capable of destabilizing the first component slowly. The two component adhesive can be used to bond various substrates such as foam, textile materials, wood, cellulosics, metals, polymers, glass and the like.

The first component is either a natural rubber or a synthetic rubber selected from the group consisting of synthetic diene rubbers, ethylene-propylene terpolymer rubbers, styrene-butadiene copolymer rubbers, chloroprene rubbers, butadiene-acrylonitrile copolymer rubbers, and chlorosulfonated rubbers, and mixtures thereof. Particularly suitable synthetic rubbers are various neoprene (polychloroprene) rubbers available from, for example, DuPont and sold under the tradenames Neoprene 750, 5587, 400 or 9414. The amount of natural or synthetic rubber present is typically about 60 to 95 percent by weight of the adhesive, and preferably from about 90 to 99 percent by weight of the adhesive composition.

Various thickeners, fillers, tackifying resins, antioxidants, acid acceptors, dispersion agents, other polymers, solvents dyes/pigments and solvents may be added to the two component adhesive and particularly the first component.

Suitable thickeners include polyacrylate (e.g. Rhoplex 638A available from Rohm & Haas), sodium caseinate, polyvinyl alcohol, methyl and ethyl cellulose, gums such as gum arabic, quar gum and aliginates. The amount of thickeners may range from about 0 to 10 percent by weight of component A, and preferably from about 0 to 3 percent by weight of component A.

Suitable fillers include inorganic fillers such as, for example, calcium carbonates, clay, talc, mica starch, silica, alumina, barium and calcium sulfate, titanium dioxide, calcium sulfite, zinc white, lignin, carbon black, aluminum trihydrate, aluminum hydroxide, magnesium hydroxide and the like. The amount of the inorganic filler may range from about 0 to 10 percent by weight of component A, and preferably from about 0 to 5 percent by weight of component A.

Suitable tackifying resins include aliphatic hydrocarbons, aromatic hydrocarbons, aromatic/aliphatic hydrocarbons, dimerized rosin, pentaerythritol esters of rosin, glycerol esters of rosin, hydrogenated pentaerythritol rosin esters, styrenated terpenes, cumerone indene resins, rosin acids, styrene-based resins, polyterpenes, phenolic modified terpenes, and styrene-modified hydrocarbons and blends thereof. The amount of the tackifying resin may range from about 0 to 30 percent by weight of component A, and preferably from about 0 to 10 percent by weight of component A.

Suitable acid acceptors include metal oxides such as zinc oxide, magnesium, oxide, litharge red lead (lead tetraoxide), calcium oxide, iron oxide and titanium dioxide. The metal oxides promote cross-linking or curing of the composition; and improve resistance to aging, heat, light and weather. The preferred metal oxide is zinc oxide. Urea and thiourea can also be used. The amount of the acid acceptors may range from about 1 to 10 percent by weight of component A, and preferably from about 4 to 6 percent by weight of component A.

Suitable antioxidants are high molecular weight hindered phenols and multifunctional phenols, amines and phosphites such as sulfur and phosphorous-containing phenols. The hindered phenols may be characterized as phenolic compounds which also contain sterically bulky radicals in close proximity to the phenolic hydroxyl group thereof. In particular, tertiary butyl groups generally are substituted onto the benzene ring in at least one of the other positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: butylhydroxyphenol ("BHT"); 4,4'-bis($\alpha,\alpha$-dimethylbenzyl) diphenylamine; 1,3,4-trimethyl 2,4,6-tris (3,5-di-tertbutyl-4-hydroxybenzyl)benzene; 2,2'-thiodiethyl-bis (3,5-di-tertbutyl-4-hydroxyhydrocinnamate); pentaerythrityl tetrakis-3(3,5-di-tertbutyl-4-hydroxybenzyl)propionate; n-octadecyl-3-(3,5-di-tertbutyl-4-hydroxphenyl)propionate; 4,4'-methylenbis(2,6-tert-butylphenol); 4,4'-thiobis (6-tertbutyl-o-cresol); 2,6-di-tertbutylphenol; 6-(4-hydroxyphenoxy)-2,4-bis(n-octylthio)-1,3,5-triazine; di-n-octadecyl 3,5-di-tert-butyl-4-hydroxybenzoate; and sorbitol hexa[3-(3,5-di-tert-butyl-4-hydroxyphenyl)propionate].

The performance of these antioxidants may be further enhanced by utilizing, in conjunction therewith, known synergists such as, for example thiodipropionate esters and phosphites; particularly useful is distearylthiodipropionate. Antioxidants and blends of antioxidants, if used, are generally present in amounts of about 0.1 to 10 weight percent by weight of component A, and preferably about 3 to 6 percent by weight of component A.

Other polymers that can be added as extenders and the like, and may include nitrile, acrylic and additional amounts of various natural and synthetic rubbers different from the first component, namely synthetic diene rubbers, ethylene-propylene terpolymer rubbers, styrene-butadiene copolymer rubbers, chloroprene rubbers, butadiene-acrylonitrile copolymer rubbers, and chlorosulfonated rubbers, and mixtures thereof. The amount of other polymers may range from about 0 to 50 percent by weight of component A, and preferably from 0 to 20 percent by weight of component A.

Suitable solvents include halogenated hydrocarbons, such as trichlorethylene, methylene chloride, perchloroethylene, ethylene dichloride, and chloroform; aromatic solvents such as toluene, xylene, benzene and mixed aromatics such as the Solveseso types, n-butyl acetate, p-dioxane and methyl isobutyl ketone. Mixtures of such solvents may also be used. The amount of solvents may range from about 0 to 10 percent by weight of component A, and preferably from about 0 to 2 percent by weight of component A.

The second component is a compound that can destabilize or cause the first component to coagulate or gel; increasing the viscosity and to eventually increase the wet tack to allow bonding to occur. This component can be an acid, salt, aldehyde, surfactant, resin dispersion or colloidal silica so long as the destabilization is slow or gradual. Suitable second components include glyoxal, other dialdehydes such as malondialdehyde, succindialdehyde, glutaric dialdehyde, pimelic dialdehyde, and suberic dialdehyde, boric acid, citric acid, formaldehyde, glycine and metal salts such as zinc sulfate, aluminum chloride, and sodium chloride. Glyoxal is preferred. Glyoxal includes aqueous solutions of glyoxal with or without small concentrations of formaldehyde, in that most commercially available glyoxal solutions will contain from about 0.01 to about 0.4 moles of formaldehyde per mole of glyoxal. The amount of the second component may range from 0.1 to 5 percent by weight, and preferably from about 0.5 to 2 percent by weight. With the proviso that the destabilization is slow.

In operation, the first compound is mixed together and supplied to an application means. The second component is added to the first component by hand mixing or by mechanical mixing, with the components then being applied on site, preferably through a single nozzle of a spray gun. After about 24 to 48 hours sufficient wet tack develops to bond like or dissimilar substrates together.

EXAMPLE

The following examples are provided to illustrate the present invention, and should not be construed as limiting thereof.

EXAMPLE 1

|  |  | % By Weight |
|---|---|---|
| First Component | Neoprene 750 | 17.7 |
|  | Rhoplex 6038A polyacrylate thickener | 1.25 |
|  | Aquamix 115 antioxidant | 4.75 |
|  | Urea acid acceptor | 2.5 |
|  | Neoprene 5587 | 73.8 |
| Second Component | Glyoxal | 0.5 |

The first component is made by placing the Neoprene 750 under good agitation. The polyacrylate thickener is added in small portions. The Aquamix 115 and urea are added and mixing is continued until all of the Rhoplex 6038A is dispersed. The Neoprene 5587 is added and mixed until uniform. This adhesive is stable for at least three months. The second component is added on site under moderate agitation and applied through a Binks Mach-1 HVLP, available from Bink Manufacturing, Franklin Park, Ill., Franklin spray gun and mixed for 5 minutes. After 24 to 48 hours, enough wet tack has developed to bond foam in the same manner as above with a pot life of two weeks or longer.

EXAMPLE 2

|  |  | Parts |
|---|---|---|
| First Component | Tylac 68522 Styrene-Butadiene available from Reichhold Chemicals, Inc. | 100 |
| Second Component | Glyoxal | 1.0 and 0.5 |

Either amount of the second component is added to the first component and applied through a Binks Mach-1 HVLP, available from Bink Manufacturing, Franklin Park, Ill., Franklin spray gun and mixed for 5 minutes. After 24 hours, enough wet tack has developed in both and the adhesives have a pot-life of two weeks.

EXAMPLE 3

|  |  | Parts |
|---|---|---|
| First Component | Tylac 68513 acrylonitrile available from Reichhold Chemicals, Inc. | 100 |
| Second Component | Glyoxal | 1.0 and 0.5 |

Either amount of the second component is added to the first component and applied through a Binks Mach-1 HVLP, available from Bink Manufacturing, Franklin Park, Ill., Franklin spray gun and mixed for 5 minutes. After 24 hours, enough wet tack has developed in both and the adhesives have a pot-life of two weeks.

The foregoing is illustrative of the present invention and is not to be construed as limiting thereof. The invention is defined by the following claims, with equivalents of the claims to be included therein.

That which is claimed is:

1. A two component adhesive suitable for spraying through application means adapted for dispensing single component adhesives, the two component adhesive comprising a natural or synthetic rubber first component and glyoxal capable of destabilizing the natural or synthetic rubber first component slowly, the glyoxal being present in an amount of less than about 5 percent by weight of the two component adhesive.

2. The two component adhesive according to claim 1 wherein the natural or synthetic rubber is selected from the group consisting of natural rubber, synthetic diene rubbers, ethylene-propylene terpolymer rubbers, styrene-butadiene copolymer rubbers, chloroprene rubbers, butadiene-acrylonitrile copolymer rubbers, and chlorosulfonated rubbers, and mixtures thereof.

3. A two component adhesive suitable for spraying through application means adapted for dispensing single component adhesives the two component adhesive comprising at least 60 percent by weight of the two component adhesive of a natural or synthetic rubber first component and glyoxal capable of destabilizing the natural or synthetic rubber first component slowly, the glyoxal being present in the amount of less than about 5 percent by weight of the two component adhesive.

4. The two component adhesive according to claim 3 wherein the natural or synthetic rubber is selected from the group consisting of natural rubber, synthetic diene rubbers, ethylene-propylene terpolymer rubbers, styrene-butadiene copolymer rubbers, chloroprene rubbers, butadiene-acrylonitrile copolymer rubbers, and chlorosulfonated rubbers, and mixtures thereof.

5. A process of bonding two like or dissimilar substrates together in a one step process comprising spraying a two component adhesive through application means adapted for dispensing single component adhesives onto at least one of the substrates, the two component adhesive comprising a natural or synthetic rubber first component and glyoxal capable of destabilizing the natural or synthetic rubber first component slowly, the glyoxal being present in an amount of less than 5 percent by weight of the two component adhesive.

6. A process according to claim 5 wherein the first component is selected from the group consisting of natural rubber, synthetic diene rubbers, ethylene-propylene terpolymer rubbers, styrene-butadiene copolymer rubbers, chloroprene rubbers, butadiene-acrylonitrile copolymer rubbers, and chlorosulfonated rubbers, and mixtures thereof.

* * * * *